US012648012B2

(12) United States Patent
Balasubramanian et al.

(10) Patent No.: US 12,648,012 B2
(45) Date of Patent: Jun. 2, 2026

(54) METHOD AND APPARATUS FOR DYNAMICALLY MANAGING WIRELESS RESOURCES IN A RADIO ACCESS NETWORK OF AN ENTERPRISE CAMPUS

(71) Applicant: Celona, Inc., Campbell, CA (US)

(72) Inventors: Srinivasan Balasubramanian, San Diego, CA (US); Satish Ananthaiyer, Campbell, CA (US); Shashideep Nuggehalli, Campbell, CA (US)

(73) Assignee: CELONA, INC., Campbell, CA (US)

( * ) Notice: Subject to any disclaimer, the term of this patent is extended or adjusted under 35 U.S.C. 154(b) by 626 days.

(21) Appl. No.: 18/081,681

(22) Filed: Dec. 14, 2022

(65) Prior Publication Data

US 2023/0199820 A1 Jun. 22, 2023

Related U.S. Application Data

(60) Provisional application No. 63/289,580, filed on Dec. 14, 2021.

(51) Int. Cl.
*H04W 72/541* (2023.01)
*H04W 28/086* (2023.01)
*H04W 72/0453* (2023.01)

(52) U.S. Cl.
CPC ..... *H04W 72/541* (2023.01); *H04W 28/0862* (2023.05); *H04W 72/0453* (2013.01)

(58) Field of Classification Search
CPC ..................... H04W 28/0862; H04W 72/0453
See application file for complete search history.

(56) References Cited

U.S. PATENT DOCUMENTS

| | | | | |
|---|---|---|---|---|
| 9,621,361 B2 * | 4/2017 | Bugenhagen | ........... | H04L 43/08 |
| 12,401,407 B2 * | 8/2025 | Hakola | ............... | H04W 72/046 |
| 2011/0044284 A1 * | 2/2011 | Voltolina | .......... | H04W 52/0206 370/331 |
| 2019/0297514 A1 * | 9/2019 | Pao | ........................ | H04W 24/08 |
| 2021/0289493 A1 * | 9/2021 | Choi | .................... | H04W 72/542 |
| 2021/0385865 A1 * | 12/2021 | Mueck | .................. | H04W 80/02 |
| 2023/0247719 A1 * | 8/2023 | Park | ...................... | H04W 72/56 370/329 |
| 2025/0081040 A1 * | 3/2025 | Thubert | ............ | H04W 28/0862 |

FOREIGN PATENT DOCUMENTS

| | | | | | |
|---|---|---|---|---|---|
| CN | 108632384 A | * | 10/2018 | ............. | H04L 29/08 |
| WO | WO-2015081169 A1 | * | 6/2015 | ............ | H04W 16/14 |
| WO | WO-2016048446 A1 | * | 3/2016 | ......... | H04L 61/6022 |
| WO | WO-2018177506 A1 | * | 10/2018 | ............ | H04W 16/10 |
| WO | WO-2019246602 A1 | * | 12/2019 | ......... | H04W 72/541 |
| WO | WO-2020025003 A1 | * | 2/2020 | ......... | H04B 10/2575 |
| WO | WO-2020028089 A1 | * | 2/2020 | ....... | H04W 28/0247 |
| WO | WO-2023093827 A1 | * | 6/2023 | ........... | H04L 1/1864 |

* cited by examiner

*Primary Examiner* — Joseph E Avellino
(74) *Attorney, Agent, or Firm* — Jaquez Land Greenhaus & McFarland, LLP; Bruce W. Greenhaus

(57) ABSTRACT

A RAN resource allocation method and apparatus that monitors operation and re-allocates wireless resources if radio resource requirements are not met for one or more BS/APS in the RAN. A system is disclosed that orthogonally allocates Bandwidth Parts (BWPs) to the APs in a RAN. The system monitors the radio resource requirements of APs in realtime, and if requirements are not being met, it can transfer radio resources from one BS/AP to another using BWPs. One objective of the invention is to optimally utilize the available spectrum.

1 Claim, 9 Drawing Sheets

METHOD AND APPARATUS FOR DYNAMICALLY MANAGING WIRELESS RESOURCES IN A RADIO ACCESS NETWORK OF AN ENTERPRISE CAMPUS

CLAIM OF PRIORITY

This non-provisional application claims priority to an earlier-filed provisional application No. 63/289,580 filed Dec. 14, 2021, entitled "Dynamic Spectrum Management for Enterprise Campuses" and the provisional application No. 63/289,580 filed Dec. 14, 2021, and all its contents, are hereby incorporated by reference herein as if set forth in full.

BACKGROUND

Technical Field

The disclosed method and apparatus relate generally to managing spectrum in a wireless communication system. In particular, the disclosed method and apparatus relates to dynamically allocating wireless resources among the base stations of a Radio Access Network (RAN) of an enterprise network.

BACKGROUND

The wireless industry has experienced tremendous growth in recent years, with rapidly improving technology, faster and more numerous broadband communication networks are being installed around the globe. Wireless networks have now become key components of a worldwide communication system that connects people and businesses at speeds and on a scale, unimaginable just a couple of decades ago. In wireless systems, multiple mobile devices are served voice services, data services, and many other services over wireless connections so they may remain mobile while still connected.

Communication Network Configurations

FIG. 1 is an illustration of a basic configuration for a communication network 100, such as a "4G LTE" (fourth generation Long-Term Evolution) or "5G NW" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs, BS/APs, RAN

"UEs", or "devices", or "UE devices" can be used to refer to a wide range of user devices having wireless connectivity, such as a cellular mobile phone, an Internet of Things (IOT) device, virtual reality goggles, robotic devices, autonomous driving machines, smart barcode scanners, and communications equipment including desktop computers, laptop computers, tablets, and other types of personal communications devices. In the illustration of FIG. 1, the UEs 101 include a first mobile phone 101a, a second mobile phone 101b, a laptop computer 101c (which can be moved around), and a printer 101d (typically situated at a fixed location).

The UEs 101 connect wirelessly over radio communication links 105 to a Radio Access Network (RAN) 107 that typically includes multiple base station/access points (BS/APs) 109. One of the advantages of such wireless networks is their ability to provide communications to and from multiple wireless devices and provide these wireless devices with access to a large number of other devices and services even though the devices may be mobile and moving from location to location.

The term "BS/AP" is used herein to include Base Stations and Access Points. The BS/APs may include an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, and a Wide Area Network (WAN) access point.

Core Network

The RAN 107 connects the UEs 101 with the Core Network 111, which provides an interface between the RAN 107 and other networks. The Core Network can have multiple functions; in one important function, the Core Network 111 provides access to other devices and services either within its network, or on other networks such as the External PDNs 103. Particularly, the UEs 101 are wirelessly connected to the BS/APs 109 in RAN 107, and the RAN 107 is coupled to the Core Network 111 utilizing any appropriate communication means, such as wireless, cable, and fiber optic. Thus, the RAN 107 and the Core Network 111 provide a system that allows information to flow between a UE in the cellular or private network and other networks, such as the Public Switched Telephone Network (PSTN) or the Internet.

In addition to providing access to remote networks and allowing information to flow between the cellular network and the external PDNs 103, the Core Network 111 includes RAN Control Units 113 that manage the wireless network and provide control of the air interface between the BS/AP 109 and the UEs 101. The Core Network 111 may also coordinate the BS/APs 109 to minimize interference within the network.

CBRS Networks

One type of wireless network that recently became available for general use by enterprise locations is a Citizens Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. CBRS provides enormous wireless networking power to organizations that have never had such an option before and opens up and creates opportunities for a range of new applications.

FIG. 2 is a diagram of an example of a CBRS wireless communication network 200. In FIG. 2, a plurality of BS/APs 202a, 202b, 202c, 202d are deployed within a location 203 on the enterprise's campus, providing service to a plurality of UEs 204. In a CBRS system, the BS/APs may be termed CBSDs.

In FIG. 2, each BS/AP 202 has a range that represents its respective wireless coverage. A first UE 202a is wirelessly connected to a first BS/AP 204a, which is providing service to it. A second UE 204b is wirelessly connected to a second BS/AP 202b and is providing service to that second UE 204b. Other UEs 204 connect to their respective BS/APs, for example third UE 204c, fourth UE 204d, fifth UE 204e, sixth UE 204f, and seventh UE 204g are shown in the enterprise location 203. All the BS/APs are connected to an operator Core Network 222 by any appropriate communication means, such as wire, fiber optic, wireless radio and/or a PDN 230. The operator Core Network 222 includes components such as an OAM Server 207, a SON assist unit 208, a Domain Proxy 209, an Automatic Configuration Server (ACS) 210, a Location Database 211, and other databases 212, all of which are connected to each other within the operator Core Network 222 by any appropriate means.

Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

SAS

The operator Core Network 222 is connected to a Spectrum Access System (SAS) 232, which is connected to a Spectrum Database 233 that includes data regarding the spectrum that it is managing. Collectively, the SAS 232 and the Spectrum Database 233 are referred to as a Spectrum Management Entity (SME) 234. The SAS 232 provides a service, typically cloud-based, that manages the spectrum used in wireless communications of devices transmitting in the CBRS band in order to prevent harmful interference to higher priority users, such as the military and priority licensees. The CBRS rules require that the SAS 232 allocate spectrum to the CBSDs to avoid interference within the CBRS band. To allocate spectrum and maintain communication between the CBSDs and the SAS 232, a series of messages are exchanged for purposes including registration, spectrum inquiry, grant, and heartbeat response. In a RAN that has multiple CBSDs, the Domain Proxy (DP) 209 may be implemented to communicate with the SAS and manage all transactions between the CBSDs and the SAS 232. The Spectrum Sharing Committee Work Group 3 (for CBRS Protocols) has established an interface specification for registering a CBSD with an SAS 232, requesting a grant of spectrum, and maintaining that grant. These message flows are described in the document titled "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016-V1.2.4, 26 June 2019.

Regardless of complexities, the CBRS band provides an opportunity to create new wireless networks, and there is a desire for utilizing and making maximum use of spectrum in the CBRS band while following the rules pertaining to the CBRS usage, including effectively responding to directions from the SAS.

SON

A self-organizing network (SON) is an automation technology designed to make the planning, configuration, management, optimization, and healing of mobile RANs simpler and faster. SON functionality and behavior has been defined and specified in generally accepted mobile industry recommendations produced by organizations such as 3GPP (3$^{rd}$ Generation Partnership Project) and the NGMN (Next Generation Mobile Networks). However, there are limitations to such functionality, and more generally, managing enterprise networks to more efficiently allocate the available network resources is an important objective.

Resource Allocation

In any enterprise wireless network there is a need for efficient use of wireless resources, while still providing the promised levels of service to the UEs attached to the wireless network. Efficient radio resource allocation is important to provide the QoS promised by a mobile network provider. Efficient management can be challenging when there is a lack of Carrier Aggregation (CA) support (such as in LTE/NR), and when there are complications caused by fragmented spectrum, such as CBRS with PAL allocation and allowed General Authorization Access (GAA) channels.

SUMMARY

Radio resource allocation is critical for the effectiveness of a cellular wireless network; however conventional resource allocation techniques are time intensive or can be inadequate to respond to network problems. In order to more efficiently operate a wireless radio network, a RAN resource allocation method is disclosed that monitors operation and re-allocates wireless resources if radio resource requirements are not met for one or more BS/APS in the RAN. A system is disclosed that can transfers radio resources from one BS/AP to another using Bandwidth Parts (BWPs). One objective of the invention is to optimally utilize the available spectrum. In one embodiment this objective may be achieved by dynamically repartitioning the communication spectrum or retaining spectrum and reallocating portions of Physical Resourse Block (PRB) sharing, fractional frequency, frequency avoidance. The system and method can be employed to more efficiently manage an enterprise network.

In normal network operation, there is unused bandwidth that varies during network operation depending upon a number of factors. During operation the RAN and particularly the CBSDs can be observed, and it may be useful to balance and re-balance the load on the CBSDs in the RAN deployment to utilize the unused bandwidth, which can provide greater network efficiency and better service to the UEs. Particularly, the EN observes RAN operations and monitors the ongoing radio resource requirements of each CBSD in a RAN deployment. If a CBSD's resource requirements are not being met, then the EN determines if another CBSD may have unused resources that can be made available to the CBSD that needs them, and load balances the network. Load balancing may include determining the occupied bandwidth to be used by each CBSD in the deployment responsive to the radio resource requirements of all the CBSDs in a deployment. The allocation for each CBSD may be managed based on the capacity requirements based on the UE population and the active set of services on the individual APs.

The system RAN allocation system described herein is particularly useful when Carrier Aggregation (CA) is not available in a wireless network, but it can also be useful even if CA is supported.

In some embodiments the enterprise wireless network operates on the Citizens Broadband Radio Service (CBRS band), the BS/APs in the RAN comprise CBRS Devices (CBSDs) that are located at a campus location and form part of an enterprise network. In alternative implementations, other network architectures and other technologies, such as mm-wave, or spectrum purchased/licensed from others, could be utilized.

BRIEF DESCRIPTION OF THE DRAWING

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) Enterprise Network

An implementation of an enterprise wireless communication network (EN) at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

An enterprise wireless communication network (EN) is a private network. Private networks are operated for use within a limited area by a limited group of authorized users, whereas public networks generally cover a larger area and are open for use by anyone that subscribes to the service by the network operator. One or more ENs can be created at a location such as a warehouse, factory, research center or other building, and are usually operated by an organization for its own use. Other types of private networks may be operated by a private network manager for use by more than one organization. Although described in the context of an enterprise wireless communication network, the principles disclosed can also apply to any private wireless network.

Figure 1:
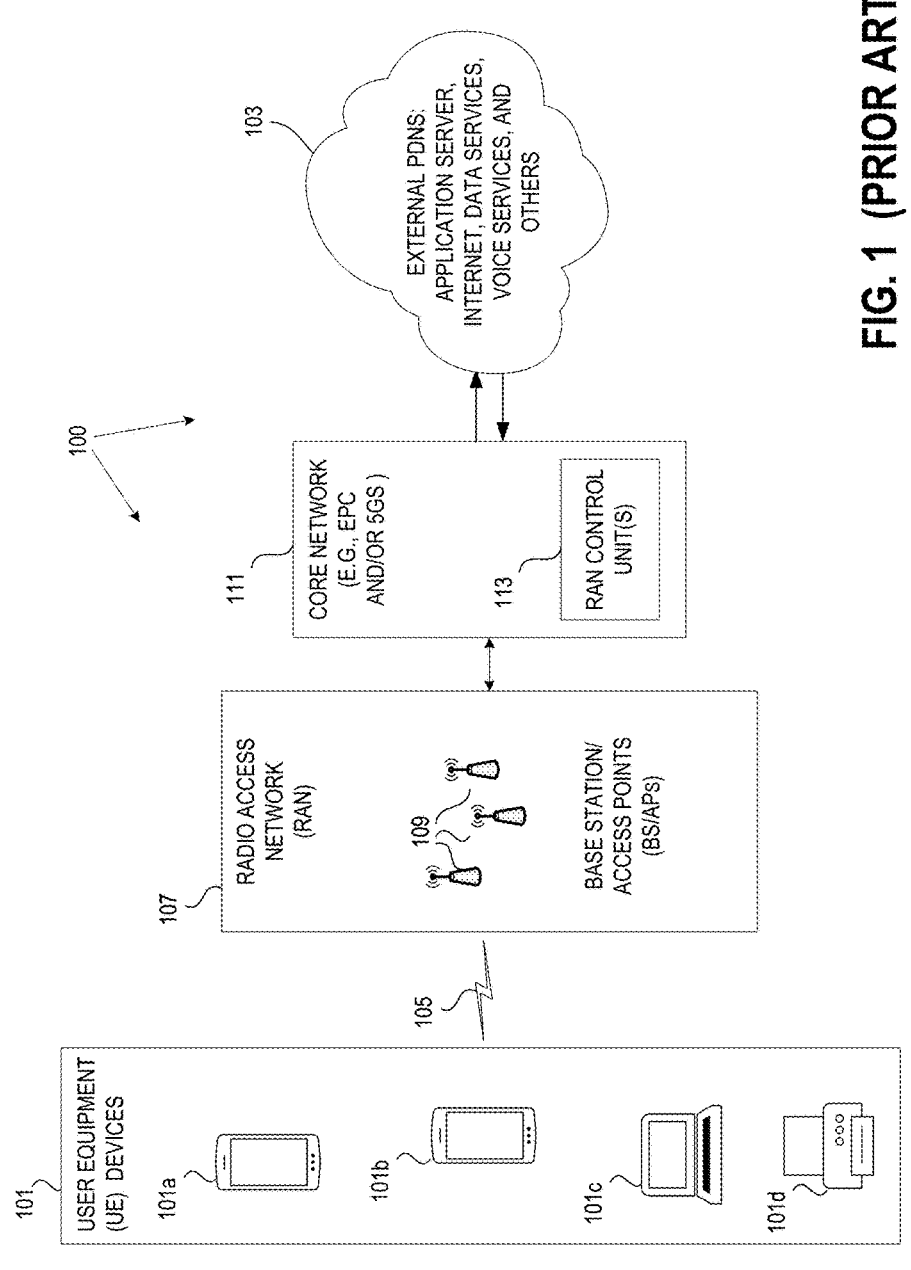
FIG. 1 is an illustration of a basic configuration for a communication network, such as a "4G LTE" (fourth generation Long-Term Evolution) or "5G NR" (fifth generation New Radio) network.

An EN may comprise any appropriate wireless network technology that can connect to UEs. For example, the LTE (4G) network shown in FIG. 1 and/or the NR (5G) Network shown in FIG. 2 can be implemented in an EN. In addition, the EN may also be implemented as a CBRS network using, for example, the LTE(4G) or NR(5G) technologies.

(2) Communication Networks

Communication networks and system components may be described herein using terminology and components relating to 4G, 5G, and CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP) and is used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band, and the BS/APs comprise CBRS devices (CBSDs) that are located at a campus location.

(3) Acronyms

Some of the acronyms used herein are as follows:

ACS: Automatic Configuration Server

BLER: Block Error Rate

BWP: Bandwidth Part

BS/AP: Base Station/Access Point

CA: Carrier Aggregation

CBRS: Citizens Broadband Radio Service

CBSD: CBRS devices

CDF: Cumulative Distribution Function

GSCN: Global Synchronization Channel Number

HO: Handover

IBW: Instantaneous Bandwidth

IC: Interference Cancellation

LNA: Low Noise Amplifier

MCS: Modulation and Coding Schemes

MIMO: Multiple Input—Multiple Output

MU-MIMO: Multiple User MIMO

NR: New Radio (5G)

OBW: Occupied Bandwidth

QoS: Quality of Service

PA: Power Amplifier

PAL: Priority Access License

PCI: Physical Cell Identifier

PDN: Packet Data Network

PSS: Primary Synchronization Signal

RAN: Radio Access Network

RF: Radio Frequency

RIC: RAN Intelligent Controller

RRC: Radio Resource Control

SAS: Spectrum Access System

SINR: Signal to Interference-plus-Noise Ratio

SON: Self-Organizing Network

SS/PBCH: Physical Broadcast Channel

SSB: Subsystem Block

SSS: Secondary Synchronization Signal

TA: Timing Advance

UE: User Equipment (4) UEs, BS/APs, RAN, Core Network

As used herein, the term "UE", or "devices", or "UE devices" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets, and other types of personal communications devices. In some cases, the UEs may be mobile; in other cases, they may be installed or placed at a fixed position within a campus location. In other examples, the UEs may include factory sensors installed at fixed locations from which they can remotely monitor equipment such as an assembly line or a robotic arm's movement. Examples of services that can be provided to UEs by a wireless network include:

voice calls;

web browsing;

downloads of document or other information;

video (e.g., YouTube);

social media (e.g., Facebook, Twitter); and video security cameras, sensors, and many others.

The UEs connect wirelessly over radio communication links to a Radio Access Network (RAN) that typically includes multiple base station/access points (BS/APs) that include antennas, amplifiers, and other electrical and control units for communicating with the UEs. Typically, the radio communication links operate using a Radio Resource Control (RRC) protocol, which is managed by circuitry in the BS/APs.

The term "BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs and circuitry that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

A Core Network provides a number of functions and services, including an interface between the RAN and other networks. In one important function, the Core Network provides the UEs in the RAN with access to other devices and services either within its network, or on other networks such as the External PDNs. Particularly, in cellular networks and in private networks, the UEs wirelessly connect with BS/APs in the RAN, and the RAN is coupled to the Core Network. Therefore, the RAN and the Core Network provide a system that allows information to flow between a UE in the cellular or private network and other networks.

In addition to providing access to remote networks and allowing information to flow between the cellular network and the external PDNs, the Core Network may include RAN Control Units that manage the wireless network and provide control of the air interface between the BS/AP and the UEs. The Core Network may also coordinate the BS/APs to minimize interference within the network.

(5) CBRS Networks

A Citizens Broadband Radio Service (CBRS) network utilizes the CBRS radio band of 3550-3700 MHz, nominally divided into fifteen channels of 10 MHz each. The US Federal Government recently finalized rules (Rule 96) that allow general access to the CBRS band. The CBRS rules set forth detailed requirements for the devices that operate in a CBRS network and how they communicate. Both LTE networks and 5G networks can be implemented in CBRS systems. Base stations (BS/APs) within a CBRS network are termed "CBSDs", and UEs are termed End User Devices (EUDs). All the CBSDs are connected to an operator Core Network by any appropriate communication means, such as wire, fiber optic, wireless radio and/or a PDN, which includes components such as an OAM Server, a SON assist unit, a Domain Proxy, an Automatic Configuration Server (ACS), a Location Database, and other databases, all of which are connected to each other within the operator Core Network by any appropriate means. The operator Core Network is connected to an SAS, which is connected to a Spectrum Database that includes data regarding the spectrum that it is managing; collectively, the SAS and the Spectrum Database are referred to as a Spectrum Management Entity (SME).

(6) RF Environment, Campus Location

The design of a RAN deployment, and the allocation of resources in a deployed RAN, is greatly dependent upon the RF environment at the campus location where the RAN is deployed. At any RAN deployment, the RF environment can vary due to a variety of causes; for example, physical obstacles like buildings affect the RF environment, also the relative positioning of the transmitters and UEs, interference, campus layout, features, and building construction: walls, materials, carpeted/non-carpeted all can affect the RF environment and may vary widely between locations. In other words, the RF environment can vary greatly within a RAN, and accordingly each BS/AP may see a different path loss.

Following are examples of a campus location and a building in which a RAN is deployed, all of which contribute to the RF environment. Particularly, FIG. 3 is a perspective illustration of a campus location 300 that has wireless coverage and FIG. 4 is a cross-sectional view of a building 400 on the campus location 300.

Figure 3:
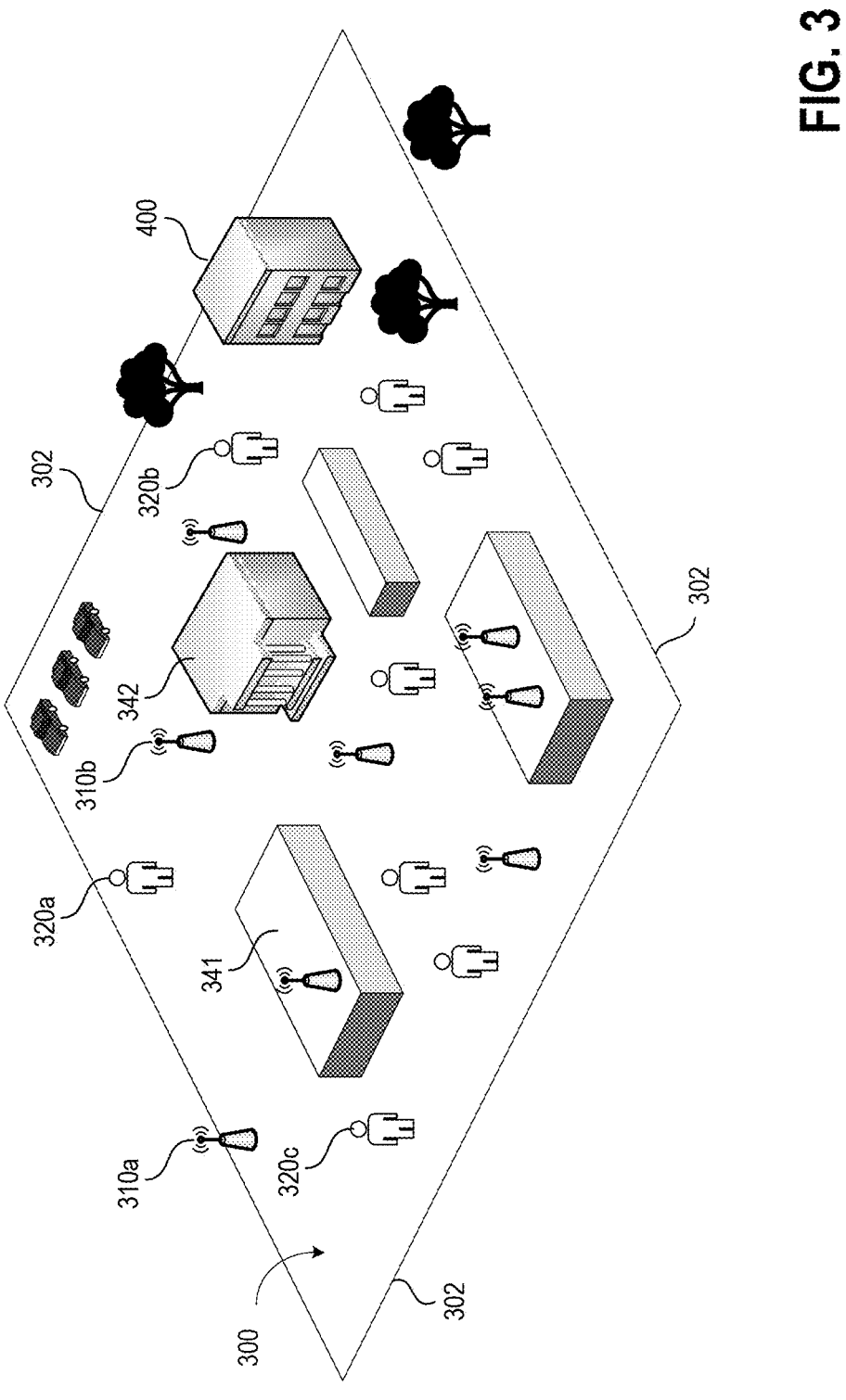
FIG. 3 is a perspective illustration of a campus location in which a plurality of BS/APs of an Enterprise Network (EN) are installed to provide wireless coverage to a plurality of mobile users.

FIG. 3 is a perspective illustration of a campus location 300 in which a plurality of BS/APs including at least a first BS/AP 310a, a second BS/AP 310b (collectively 310) of an Enterprise Network (EN) are installed to provide wireless coverage to a plurality of mobile users such as a first user 320a a second user 320b, and a third user 320c (referred to collectively as 320). Each mobile user 320 may be carrying one or more UEs such as a mobile phone, laptop computer, or some other device that can be connected to the EN.

The campus location 300 defines a boundary perimeter 302, and the BS/APs 310 are deployed within the boundary 302 having various structures 341, 342, 400. The positions and configuration of the BS/APs 310 deployed within the campus location 300 are selected to provide wireless coverage to the plurality of users 320 for the EN. The BS/APs 310 may be installed indoors and outdoors, and may comprise any type of BS/AP. The BS/APs 310 generally provide wireless coverage substantially throughout the campus location 300, indoor and outdoor, with coverage usually extending to surrounding areas at least to some extent. In one embodiment the BS/APs 310 comprise CBSDs and the EN includes a CBRS network. In some embodiments some of the BS/APs 310, particularly the BS/APs installed indoors, have a UE built into them. These built-in UEs can be used for making measurements that can be used to determine the MN footprint information, as described herein.

Figure 4:
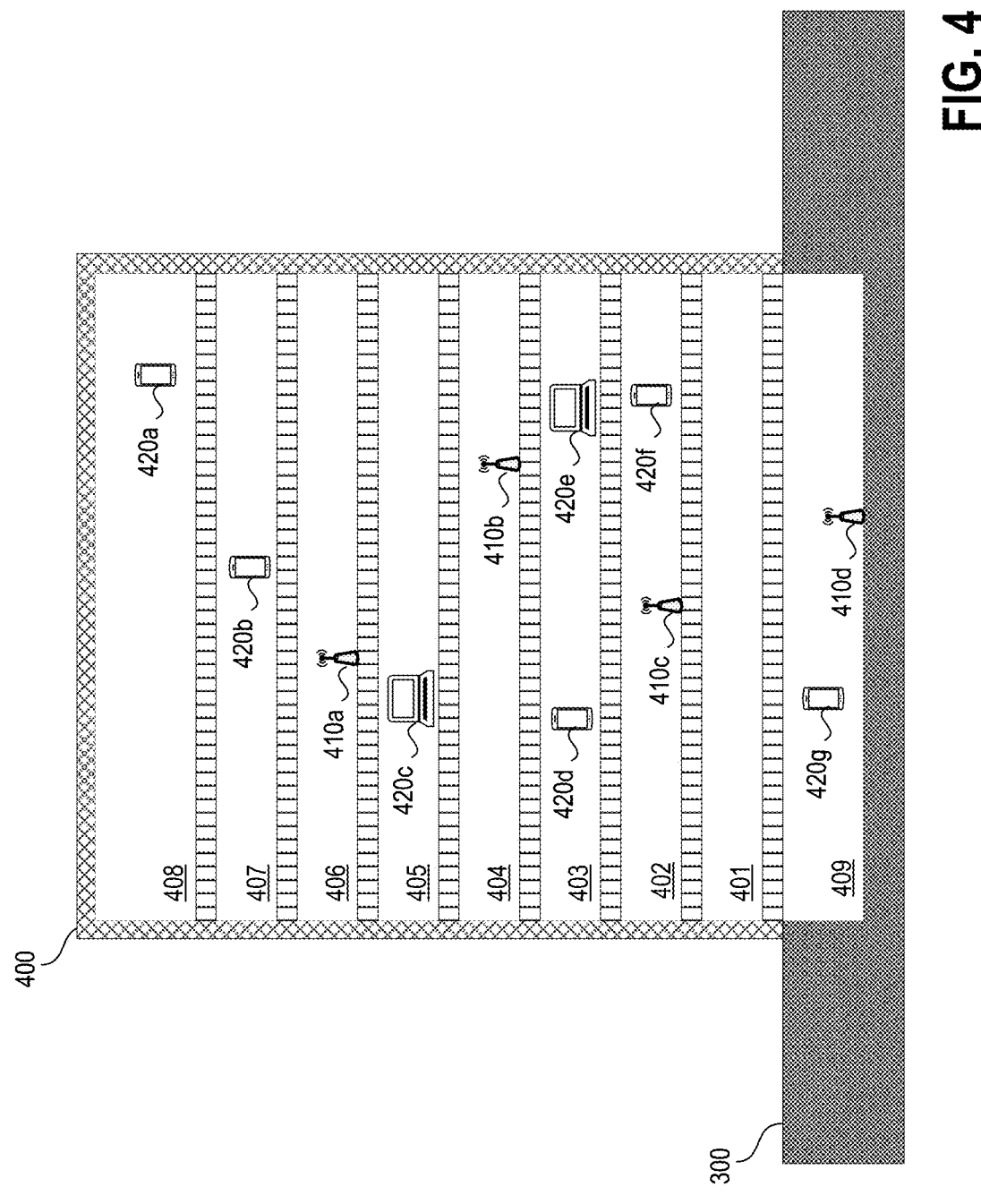
FIG. 4 is a cross-sectional view of a building on the campus location in which BS/APs are installed on different floors.

FIG. 4 is a cross-sectional view of a building 400 on the campus location 300 in which a plurality of BS/APs of the RAN are installed on different floors having various computers and cell phones 420a-420g. In this example, a first BS/AP 410a is installed on the sixth floor 406, a second BS/AP 410b is installed on the fourth floor 404, a third BS/AP 410c is installed on the first floor 401, and a fourth BS/AP 410d is installed in the basement 409. Building construction (walls, materials, carpeted/non-carpeted) can vary widely between locations, and all can affect the RF environment. In some embodiments, the indoor BS/APs 410 have a UE built into them, which can be used for making measurements.

(7) Overview

Radio resource allocation is critical for the effectiveness of a cellular wireless network; however conventional resource allocation techniques are time intensive or can be inadequate to respond to network problems. In order to more efficiently operate a wireless resources in a radio network, a RAN resource allocation method is disclosed that monitors operation and re-allocates wireless resources if radio resource requirements are not met for one or more BS/APS in the RAN. A system is disclosed that can transfers radio resources from one BS/AP to another using Bandwidth Parts (BWPs). One objective of the invention is to optimally utilize the available spectrum. In one embodiment this objective may be achieved by dynamically repartitioning the communication spectrum or retaining spectrum and reallocating portions of PRB sharing, fractional frequency, frequency avoidance. The system and method can be employed to more efficiently manage an enterprise network. The system RAN allocation system described herein is particularly useful when Carrier Aggregation (CA) is not available in a wireless network, but it can also be useful even if CA is supported.

(8) Bandwidth Descriptions

Figure 5:
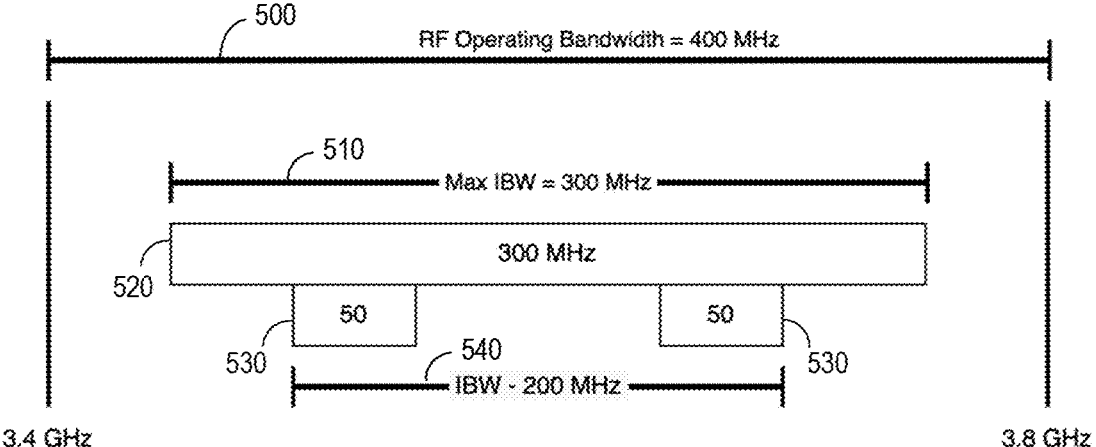
FIG. 5 is a bandwidth diagram showing an example of spectrum resources available to the network, and resources allocated to a BS/AP.

FIG. 5 is a bandwidth diagram showing an example of spectrum resources available to the network, and resources allocated to a CBSD. As used herein, "wireless resources" should be interpreted broadly to include any radio frequency (rf) spectrum and signals transmitted on the rf spectrum. To describe wireless resource management for purposes of description (especially relating to 5G), it is useful to define following terms:

RF operating bandwidth (500): the permissible RF bandwidth within which a RAN deployment can operate.

BSAP Frequency Range, or Maximum IBW (510): the maximum bandwidth that each BS/AP is capable of operating in (i.e., receiving and transmitting), defined by the BS/AP's hardware. Each BS/AP in a deployment may have its own capabilities and limitations; typically the maximum IBW for an BS/AP is determined by BS/AP hardware that defines the frequency range that the BS/AP can operate in. For example, the in some BS/APs the maximum IBW may be determined by the LNAs (Low Noise Amplifiers) and the band-pass filter(s) in the BS/AP. In a given deployment, the BS/APs may have different frequency ranges, e.g.; a first BS/AP may have a 50 MHz frequency range, and another BS/AP may have a 100 MHz range.

Bandwidth part (BWP) (530): A contiguous section of bandwidth within the IBW of an BS/AP. The BWPs are defined and assigned by the network and used by the BS/APs. An active BWP is a BWP that is allocated to an BS/AP by the SON. An BS/AP can be assigned multiple BWPs.

In CBSD implementations, the RF power amplifier (PA) and Low Noise Amplifiers (LNAs) should be designed to allow for partial use of the allocated 100 MHz and potentially employ Interference Cancelation (IC) to avoid the parts of the spectrum that is not applicable for a given CBSD. Thus, the RF chains in the CBSDs must be capable of supporting the partial use of the spectrum to which they are assigned.

Occupied Bandwidth (OBW) (520): The bandwidth actually occupied by the base station during operation, defined by the sum of the active bandwidth parts of the band allocation(s) operated.

Instantaneous Bandwidth (IBW) (540): The section of bandwidth defined between the outer frequency boundaries of the operating band(s) assigned to the BS/AP. As defined, the IBW may include both active and non-active BWPs.

In all cases, for each BS/AP: Frequency Range >OBW>IBW

The following description describes a method for allocating RAN resources and avoiding interference in the context of a CBRS system; more generally the principles described herein apply to any spectrum limited wireless network. In a CBRS network the access points are termed "CBSDs", in this context it should be understood that the term CBSD (and AP) is interchangeable with the term "BS/AP" used herein.

(9) CBRS Registration Example

The CBRS band has 150 MHz allocated. Assume 3 CBSDs are deployed on a site, and each will be given a different spectrum. A request is sent from the domain proxy to the SAS as {CBSD 1, 2, and 3 belonging to an Interference Coordinated Group (ICG)}. In response, the SAS provides channels available to each CBSD:

CBSD-1: 1-8

CBSD-2: 3-10

CBSD-3: 11-13

Using this information, the SON looks into possible spectrum available to each CBSD. In response, the SON makes the follow allocations orthogonal (as much as possible):

CBSD-1: 1-2, 7-8

CBSD-2: 3-6, 6-7

CBSD-3: 11-13

These allocations are each provided to the individual CBSDs. CBSD-1 registers with the SAS indicating

IBW: 1-8

OBW-1: 1-2

OBW-2: 7-8

CBSD-2 registers with the SAS indicating:

IBW: 3-8

OBW-1: 3-6

OBW-2: 6-7

CBSD-3 registers with the SAS indicating:

IBW and OBW: 11-13

(10) Allocating RAN Resources

Figure 6:
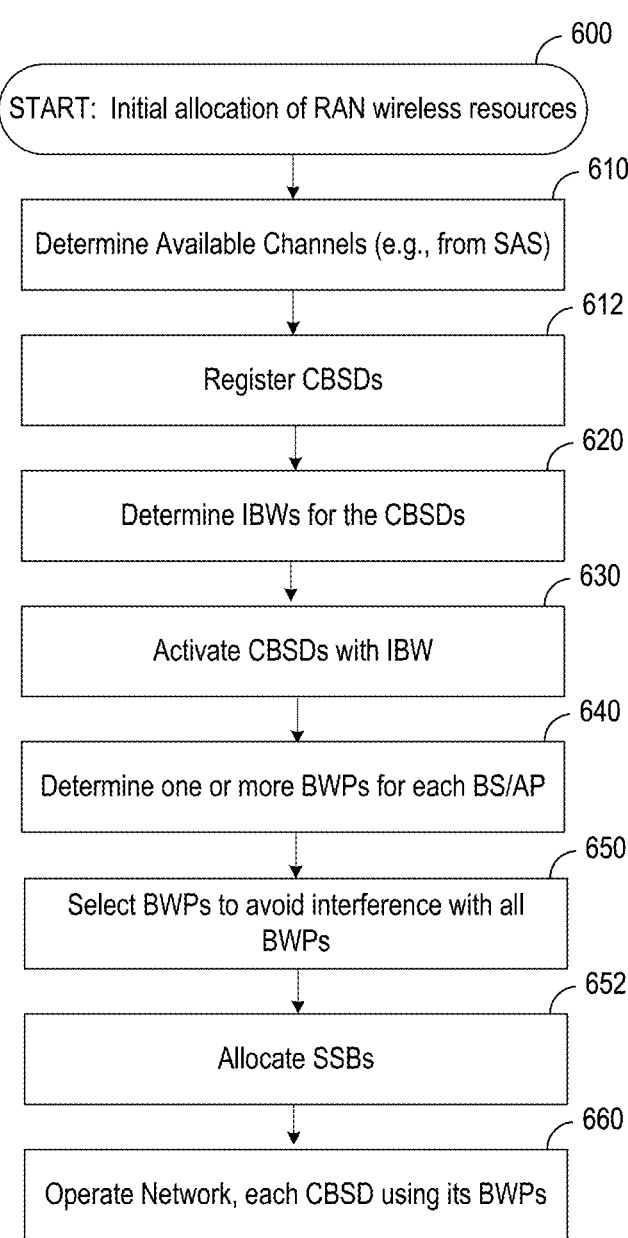
FIG. 6 is a flowchart that shows a method for allocating RAN resources and avoiding interference in a CBRS system.

FIG. 6 is a flowchart that shows a method for allocating RAN resources and avoiding interference in a CBRS system implemented in an Enterprise Network (EN), The CBRS system is spectrum-controlled band divided into a plurality of channels, and includes a plurality of CBSDs deployed on a campus for communicating with a plurality of UEs.

Beginning at 600, the available channels in the CBRS band are determined (STEP 610) by negotiating with the SAS. Typically the EN includes a domain proxy which communicates with the SAS, and it can get the available spectrum for each CBSD. In other embodiments, the CBSDs can communicate directly with the SAS. The EN then registers the CBSDs (STEP 612) with the SAS, and receives spectrum allocation, which allows each of the CBSDs to gain access to CBRS frequencies.

Responsive to the available channels, the EN determines the IBW for the CBSDs (STEP 620). Particularly, the EN performs SON functions that determine the IBWs for the CBSDs in the network. Initially, before the network needs are known, the IBWs can be determined in a predetermined manner, such as equally. For example, a 100 MHz chunk of spectrum (IBW) can be allocated to all of the CBSDs. Later, during operation when network needs are better known, the IBWs may be re-allocated to better serve the network's needs.

The term "SON" refers to a Self-Organizing Network, and SON function and operations are used herein in their broad sense. In some embodiments, monitoring and SON operations may require active exchange of information across the APs. In some embodiments a RAN Intelligent Controller (RIC) which has separate modules for non-realtime, semi-realtime, and realtime operations, can be utilized as a SON platform.

Figure 7:
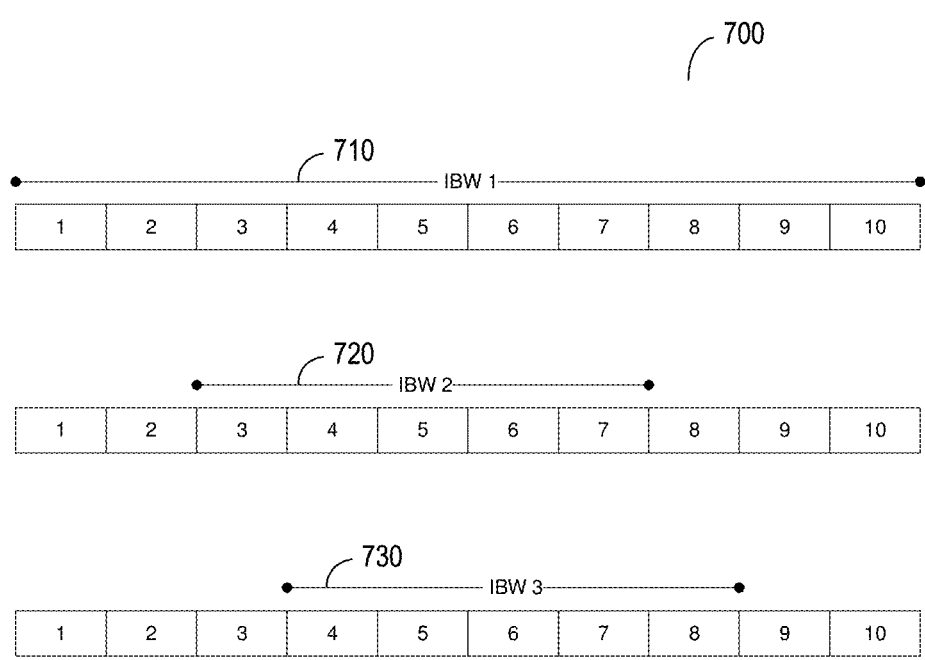
FIG. 7 is a bandwidth allocation diagram showing BWP allocations for first, second, and third CBSDs in one example, illustrating that the bandwidth of any or all of the IBWs can cover different bandwidths, and can also be overlapping.

Reference is made briefly to FIG. 7 which illustrates several IBWs 700. The bandwidth of any or all of the IBWs 700 can cover different bandwidths, and can also be overlapping, as shown in FIG. 7, which discloses a first IBW 710 assigned to a first BS/AP, a second IBW 720 assigned to a second BS/AP, and a third IBW 730 assigned to a third BS/AP. Generally, at least two of the IBWs 700 will be overlapping. For example, the first IBW 710 of 100 MHz spanning channels 1-10 may be determined for a first CBSD and the second IBW of 50 MHz spanning channels 3-7 may be determined for a second CBSD, which overlaps the first IBW 710. A third IBW 730, also of 50 MHz spans channels 4-8, which partially overlaps with the second IBW 720.

The CBSDs are then activated with their respective IBWs (STEP 630). For example, the first CBSD is activated with the first IBW 710, and the second CBSD is activated with second IBW 720.

The SON function then selects (STEP 640) for each IBW, their BWPs, including a subset of the frequencies/symbols allowed for each AP for scheduling (downlink) DL and UL (uplink), within their assigned spectrum. This subset of frequencies and symbol defines the occupied bandwidth that the associated CBSD can operate (communicate) with. The frequencies within the occupied bandwidth are defined in terms of bandwidth parts (BWPs), which are sections of contiguous bandwidth within the occupied bandwidth. In some embodiment, the BWPs may be channels or fractions of channels.

In the example of FIG. 7, the first BS/AP is assigned the channels 2, 4, and 9-10, the second BS/AP is assigned channels 3, 5, and the third BS/AP is assigned channels 6, 7. Therefore the occupied bandwidth of the first BS/AP spans 90 MHz and includes BWPs 2, 4, and 9-10 The occupied bandwidth of the second BS/AP spans 30 MHz and includes BWPs 3 and 5. The occupied bandwidth of the third BS/AP spans 20 MHz and includes channels 6 and 7. In this diagram, the channels are used for illustration of BWPs, in other embodiments the BWPs may includes fractional channels, or other parts of the bandwidth, as defined by the SON.

As shown in FIG. 7, any of the BWPs within the occupied bandwidths may be non-contiguous with other BWPs in the occupied bandwidth. In the example, the first occupied bandwidth includes a first plurality of non-contiguous bandwidth parts utilized for communication by the first CBSD, and the second occupied bandwidth includes a second plurality of non-contiguous bandwidth parts utilized for communication by the second CBSD.

The SON function assigns BWPs to each of the CBSDs, thereby defining the occupied bandwidth for each CBSD.

Initially, the SON may assign the BWPs equally, or based upon predictions about what will be needed by the network. These BWPs may be assigned working around the PAL and GAA allocations provided to other CBSDs in the same deployment. The BWPs are also chosen to avoid transmitting on the BWP allocations provided to neighboring deployments. As will be described, after the network operation can be observed and the CBSDs monitored, the SON can re-assign the occupied bandwidth parts responsive to the radio resource requirements of each CBSD in a deployment.

The SON selects the bandwidth parts of CBSDs to avoid interference (STEP 650) between CBSDs that may potentially interfere with each other (such as CBSDs nearby each other). In other words, the BWPs of potentially-interfering CBSDs are selected to be orthogonal to avoid interference. In one embodiment, orthogonality is provided by selecting non-overlapping BWPs for potentially-interfering CBSDs. In an example, the BWPs of the first occupied bandwidth (a first CBSD) are orthogonal and do not overlap with the BWPs of the second occupied bandwidth (a second, potentially-interfering CBSD).

As required by standards, in order to allow a CBSD to be found by a UE, the CBSD transmits a subsystem block (SSB). This SSB is allocated by the SON (STEP 652) to one of the BWPs of each CBSD, to work around the other CBSD's SSBs. Also, the SSB allocation preferably takes into account the possibility of re-allocation: if the BWP that transmits the SSB is later changed to another CBSD, then SSB would also have to be changed, which although feasible is not desirable. Therefore, the SON preferably allocates the SSB in a BWP that is not likely to be later changed, such as the top 50 MHz. SSB allocations should be avoided in overlapping portions of the IBW, and channels that are likely to have PAL or GAA allocations should also be avoided. The need to change may be difficult to predict, and it is recognized that there are some situations where changing the SSB will be unavoidable. Preferably the SSB will be allocated in a portion of the spectrum where it is unlikely to be changed.

The network then operates (STEP 660), with each CBSD utilizing the BWPS assigned to it. In summary, each CBSD implements the BWPs based on the allocations from the SON. In operation, the consequence is that the UEs will be served only using the defined BWPs with this given AP. In one example, as a consequence the first CBSD will be operated using a first occupied bandwidth that is smaller than the first instantaneous bandwidth, and the second CBSD will be operated using a second occupied bandwidth that is smaller than the second IBW, selected to avoid interference with the first occupied bandwidth.

(11) Overview of Managing Operations

In normal network operation, there is unused bandwidth that varies during network operation depending upon a number of factors. During operation, the RAN and particularly the CBSDs can be observed, and it may be useful to balance and re-balance the load on the CBSDs in the RAN deployment to utilize the unused bandwidth, which can provide greater network efficiency and better service to the UEs. To balance the load across the CBSDs, the RAN resources can be re-allocated among the CBSDS in the deployment responsive to the radio resource requirements of the CBSDs.

Particularly, the EN observes RAN operations and monitors the ongoing radio resource requirements of each CBSD in a RAN deployment, which can include measuring the aggregate residual delay for each CBSD. If the aggregate residual delay exceeds a threshold, then it may be determined that the CBSD's resource requirements are not being met. Other measures for radio resource monitoring, such as QoS may also be used.

If a CBSD's resource requirements are not being met, then the EN determines if another CBSD may have unused resources that can be made available to the CBSD that needs them, and load balances the network.

In one embodiment, if a threshold (such as the aggregate residual delay for a CBSD) is exceeded, then reallocation may use a SON algorithm that identifies and dynamically balances the subset of the frequencies/symbols allowed for each AP for scheduling (downlink) DL and (uplink) UL. (based on the UE population and the active set of services on the individual APs.) Some of the wireless resource control techniques for reallocation may include:

spectrum reallocation fractional frequency re-use (avoidance)

PRB sharing or avoiding specific PRBs

Particularly, if the EN determines that the radio resource requirements are not being met, then the SON determines appropriate load balancing for the CBSDs. Load balancing may include determining the occupied bandwidth to be used by each CBSD in the deployment responsive to the radio resource requirements of all the CBSDs in a deployment. The allocation for each CBSD may be managed based on the capacity requirements based on the UE population and the active set of services on the individual APs.

(12) Flowchart: Managing Operation

Figure 9:
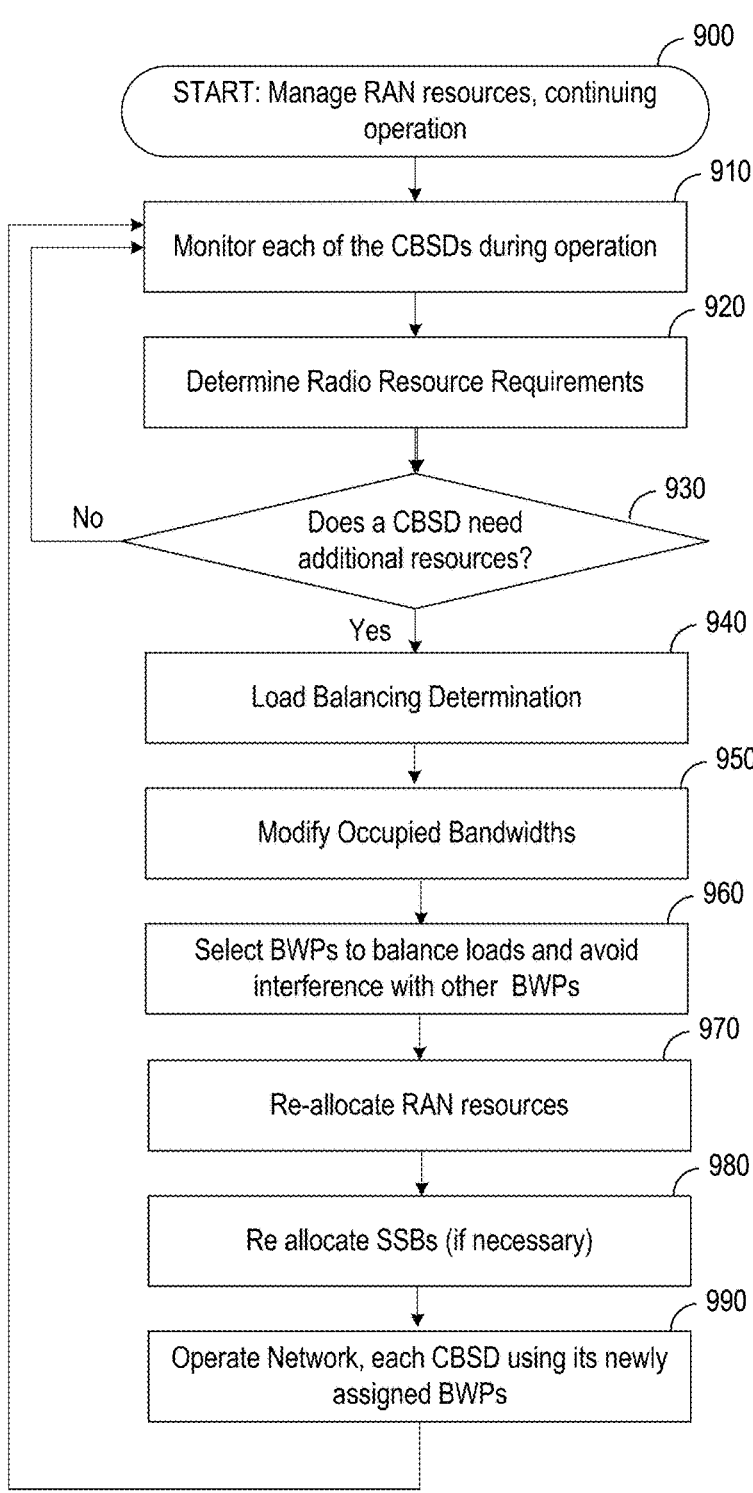
FIG. 9 is a flowchart showing operations to manage and re-allocate RAN resources during continuing network operation.

FIG. 9 is a flowchart 900 showing operations to manage and re-allocate RAN resources during continuing network operation. The EN monitors the each of the CBSDs during operation (STEP 910 to determine radio resource requirements (STEP 920). Monitoring can be done in realtime. Monitoring the radio resource requirements may include monitoring the BS/APs in the RAN deployment to determine aggregate residual delay at each BS/AP. Monitoring the radio resource requirements may include receiving information from each BS/AP indicative of its capacity needs based on realtime end-user-device association and active data flows indicative of loading in the BS/AP. Responsive to this information, the capacity needs of each BS/AP can be determined. Other methods of monitoring the radio resource requirements may also be used.

Responsive to the radio resource requirements, the EN determines (STEP 930)whether a CBSD in the deployment needs additional resources. If not, the operation returns to monitoring (STEP 910). But if the EN determines that a BS/AP needs additional resources (e.g.; the first CBSD), then a determination is made (STEP 930) as to whether one or more of the other CBSDs have unused or under-utilized wireless resources available. The determination of available resources can be made by comparing the assigned wireless resources with the monitored radio resource requirements for each CBSD.

When the EN determines that a CBSD needs additional resources, then a load balancing determination (STEP 940) can be done to modify the occupied bandwidths (STEP 950) of the first BS/AP and the one or more of other BS/APs that have wireless resources available, responsive to the monitored radio resource requirements in the RAN deployment. The load balancing determination can be made responsive to the reported capacity information and loading from active data flows, so that the radio channel capacity allocations approximately balance the load for each BS/AP within a deployment. In effect, load balancing transfers bandwidth (STEP 960) between one or more BS/APs in the RAN and the first BS/AP so that the radio channel capacity allocations approximately balance the load for each BS/AP within the RAN deployment and avoid interference situations.

Figure 8:
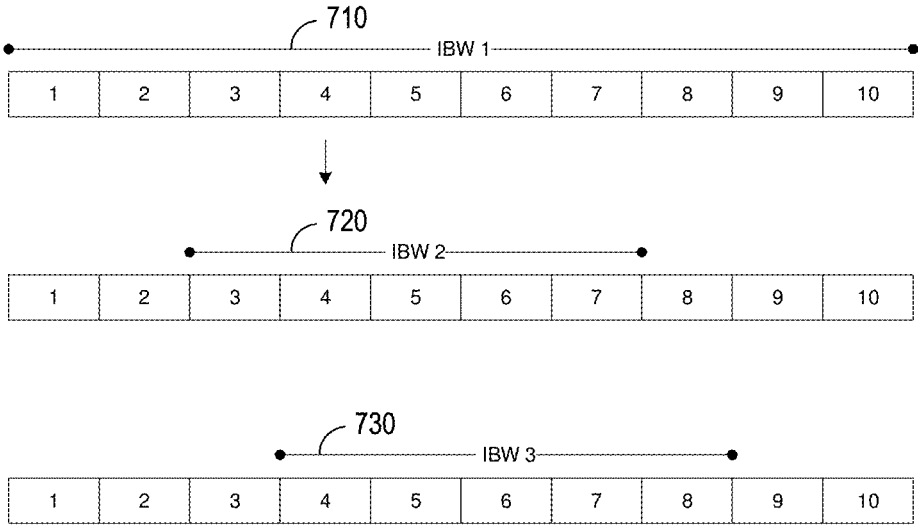
FIG. 8 is a bandwidth allocation diagram showing BWP allocations for first, second, and third CBSDs in second example, illustrating transferring a BWP from one BS/AP to another.

FIG. 8 shows the result of a reallocation example. In this example, it is assumed the second BS/AP (IBW 720) needs more resources, the first CBSD has some available, and therefore BWP 4 is transferred from the first BS/AP to the second BS/AP.

In some embodiments load balancing (STEP 940) can take into account all the CBSDs in the deployment; i.e., which allows managing the RAN resources on the basis of the radio resource requirements of all the CBSDs in the RAN deployment.

In some embodiments, increased flexibility can be achieved with the support of flexible slot formats to better DL and UL capacity. However, given that such configuration changes may be infrequent, it is most likely to support the suggested behavior with static slot format configurations.

The load balancing determination includes changing the occupied bandwidth to be used by the first BS/AP and the transferring BS/APs, including re-assigning bandwidth parts to the first BS/AP and the transferring BS/APs responsive to the radio resource requirements.

Responsive to the load balancing determination (STEP 940), the RAN resources can be re-allocated (STEP 970) among the CBSDs. Example of RAN resources that can be re-allocated, include channels, bandwidth, frequencies, PRBs, slots, and symbols.

Operation then continues (STEP 990), each CBSD uses BWPs (Bandwidth Parts) based on the re-allocations; which means that the UEs are served from this given CBSD using only the defined BWPs. As above, these BWPs are defined working around the PAL and GAA allocations provided to other CBSDs in the same deployment and also used to avoid transmitting on the allocations provided to neighboring deployments.

Preferably, the load balancing determination maintains the same instantaneous bandwidths (IBWs) assigned to all the BS/APs, so that the IBWs remain fixed across all the CBSDs.

In other embodiments the load balancing determination may change at least one IBW assigned to at least one BS/AP in the RAN deployment, which has the result of thereby changing the occupied bandwidth for said BS/AP. If the result of changing the IBW is that the SSB slot is eliminated, then the SSB for this BS/AP is re-assigned (STEP 980) to a location within the new occupied bandwidth.

In some embodiments, load balancing can include 1) keeping the spectrum same, and changing the IBW and/or allocated frequency, and BWP or 2) reallocating spectrum. These two variants can be envisioned in terms of the bandwidth allocated to a (g Node B) gNB. Option 1 (preferred) will be to keep the (bandwidth) IBW and allocated frequencies fixed and only modify the BWPs. Option 2 will be to allow the IBW and the allocated frequency to also be changed. (See SSB/GSCN allocation in the section below.) More specifically the two options are:

Option 1: The SSB will be allocated in a location where it does not have to be moved as the BWP's allocation for each gNB is altered. In this option, the GSCN does not need to be redefined in response to changes to the BWP.

Option 2: The SSB is moved to allow for the changes to the BWP allocated to the gNB. This may require the GSCN to be redefined (see elsewhere). Also, the UEs may have to adapt (e.g. search again), or receive a reference notification.

(13) EN Implementation Diagram

Figure 10:
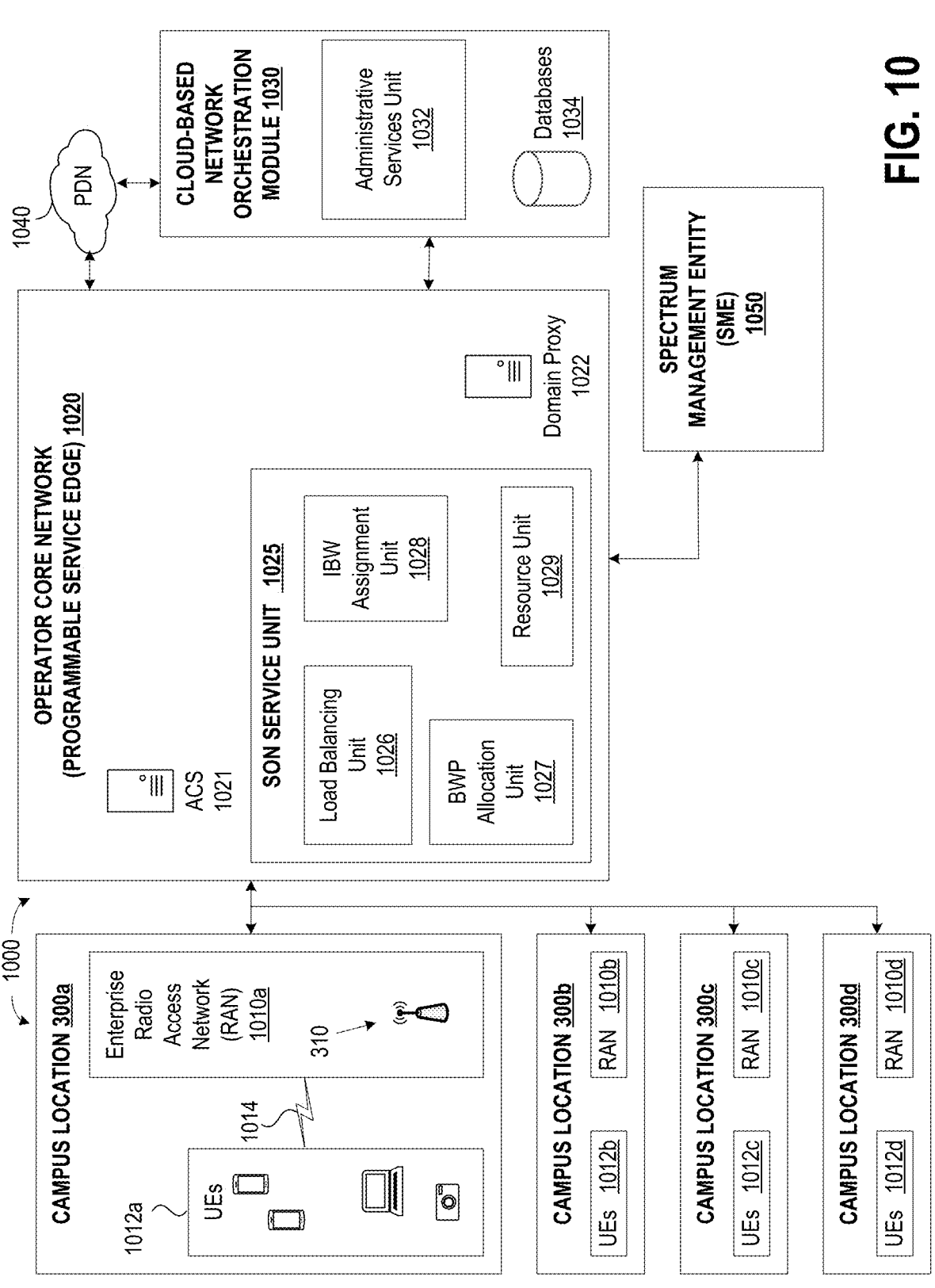
FIG. 10 is a block diagram of an implementation of an Enterprise Network (EN) that includes units for dynamically managing RAN radio resources.

FIG. 10 is a block diagram of an implementation of an Enterprise Network (EN) 1000 that includes units for allocating and re-allocating RAN resources The EN 1000 includes one or more Radio Access Networks (RANs) 1010 each located on a separate campus location 300. Each RAN 1010 comprises a plurality of BS/APs 310 that are wirelessly connected to a plurality of UEs 1012. The RANs 1010 are connected to an Operator Core Network 1020 by any suitable connection 1014. For example, all the BS/APs 310 in the RAN 1010 may be connected by any appropriate communications means, such as wire, fiber optic, and wireless radio, which is then connected to the Core Network 1020. The BS/APs in the RANs 1010 are connected to, and operated and controlled by, the Core Network 1020. Some of the RAN services may be provided by the Core Network 1020. The RANs 1010 provide wireless connection and services to a plurality of UEs on the campus locations 300. A user interface (not shown) may be provided and connected to the Core Network 1010 for administration of the EN 1000.

In an enterprise network deployment, the BS/APs 310 and elements of the RAN 1010 will be located on the campus location 300, and it is very likely that the Core Network 1020 will be physically located at or near the enterprise location, especially in large or multiple deployments in the same area. However, for smaller deployments, or for multiple small deployments, it may be more cost effective to physically locate the Core Network remotely from the enterprise location.

In some embodiments the Core Network 1020 is connected to a Network Orchestration module 1030 that may include an Administrative Service Unit 1032 for remote administration of the enterprise network, databases 1034, other components as may be necessary or useful, and other functional units such as machine learning and artificial intelligence units. The Orchestration Module 1030 is connected to the Core Network 1020 by any appropriate communications means, such as a PDN 1040. Generally, the Network Orchestration Module 1030 supports the Core Network 1020 and can provide additional services.

The Core Network 1020 (which may also be called a Programmable Service Edge or "PSE") provides a variety of services for the EN 1000 using a plurality of components connected to each other by any appropriate means. In the illustrated embodiment of FIG. 10, the Core Network 1020 includes an Automatic Configuration Server (ACS) 1021, a domain proxy 1022, and a SON (Self Organizing Network) service unit 1025 that includes a Load Balancing Unit 1026, a BWP Allocation Unit 1027, and an IBW Assignment Unit 1028. The SON unit 1025 also includes a Resource Unit 1029 that monitors all the BS/APs and determines whether or not their radio resource requirements are being met. In some embodiments, these units may be located offsite, for example at another location.

In addition, the Core Network 1020 may include components such as an MMF (Mobility Management Function) unit, a monitoring service unit, an SGW/PGW (Serving Gateway/Packet Data Network Gateway) unit, a TR069 unit, a KPI (Key Performance Indicator) service unit, databases such as a Location Database, and other units such as an Operations, Administration, and Maintenance (OAM) Server, and units for other services.

Figure 2:
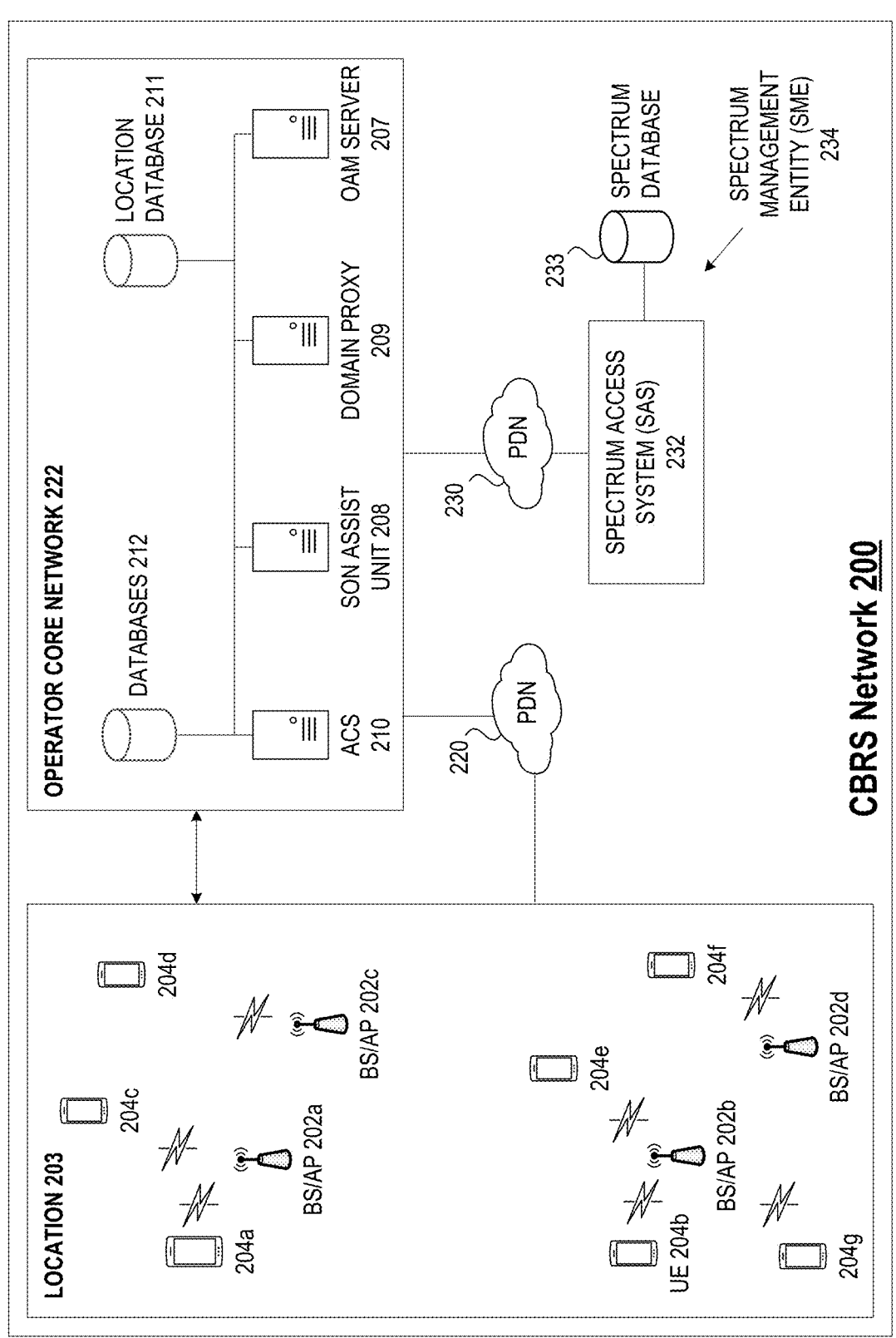
FIG. 2 is a block diagram of a wireless communication network in which a CBRS system is implemented, including BS/APs deployed at an enterprise location, UEs wirelessly connected to them, and an operator network connected to a Spectrum Management Entity (SME).

The Core Network 1020 may be connected to a Spectrum Management Entity (SME) 1050, for example it may be connected to the SME 234 shown in FIG. 2, which includes an SAS.

(14) Selective Beamforming

Radio (rf) environments, and particularly industrial environments, are not static in nature, and wireless connectivity can be affected by sources of interference and other issues which can spring up for a number of reasons, and later subside. A system will be described that uses selective beamforming triggers in industrial environments to improve wireless connectivity, working within the constraints of the internal antenna in the BS/APs. The radiation patterns in BS/APs are often constrained because of costs issues and hence the directivity is impacted, so selective beamforming is used to compensate for this. One advantage is that it can be utilized to meet promised QoS requirements.

The selective beamforming system takes the constrained antenna and creates spatial diversity and employs beamforming to serve different users at the same time, and it works to compensate for the antenna pattern constraint, starting with a constrained antenna (physical port) and leveraging that for serving multiple users from the individual antenna port.

Selective beamforming is performed based on link budget and channel experience. UE pairs are created of each antenna, and the antenna port (out of the precoder that does MU-MIMO matrix multiplication) of each user is mapped to specific antenna (antenna port-output of Precoder Matrix Indicator (PMI) . . . input of PMI is the layer mapper). Beam reciprocity can be applied to the process for the antenna selection by employing UL operation on the associated beams and use it for DL operation.

One embodiment can be envisioned as "Formed Beam", which is a rigid beam and specific UEs are assigned to specific antenna ports, and the 'formed beams' are used to achieve spatial diversity.

(15) CBSD CAT A Base Stations, and Associated Problems in an Industrial Environment CAT A base stations are associated with fixed antenna ports and can provide maximum power. The beams associated with the antennas at these antenna ports can be set up with predefined directivity during installation. This directivity can be set up by a Certified Professional Installer (CPI) according to planning needs. However, the industrial environments are not static in nature: sources of reflection and hence interference can spring up in various form factors and the interference itself may exhibit different covariance with the channels experienced by different UE in a cell.

The normal way out of this is to either perform Carrier Aggregation (CA) or a handover (HO) to ensure the connectivity is sustained. Potentially, power control algorithms can be set up to sustain the uplink until the downlink events helping in taking decisive action post the intermediate steps like CA and HO.

However, the impact on QOS should also be understood. There is no possible way out of CA and/or HO. Interference mitigation coordination schemes will help alleviate the problem until way can be found to that can help the access network maintain QOS to the greatest extent possible before this situation can occur, and hence alleviate the impact of sudden unforeseen handovers. Therefore, it may be useful to change the directivity of the beams; i.e., to re-direct the beams.

(16) CAT A UE Pairing

The concept of UE pairing introduces a new dimension in scheduler operations. The UE pairing concept envisages a continuous look out for creation of UE pairs. Inputs for determining pairing of UEs may include:

a) (QoS Flow Id) Qfi/(QoS Class Identifier) qci and (guaranteed bitrate) gbr values associated with microslice to which the UE is associated, which can give a view of Quality of Service)UQOS).

b) Wide band and/or suband channel covariance (can be derived from uplink pilots like Sounding Reference Signal (SRS))—helps with channel covariance-based pairing. This must be observed more often considering the fact the UE can move and it generally does not stay in one place.

c) Last 25 power control commands, to and phr events generated by the UE identify the potential headroom left-to understand the state of the UE from distance and power head room pov d) Static configuration—(New Radio—Absolute Radio Frequency Channel Number) arfcn of immediate neighbors, tdd config of neighbors, mimo layers in the AP and band width of operation—to consider impact of interference in channel covariance e) DL BLER, UL (Block Error Rate) BLER and (Modulation and Coding Scheme) MCS allocations from last 25 allocations—used in conjunction with power control commands, (Timing Advance) TA and (Power Headroom) PHR events to understand state of the UE from distance point-of-view (closer distance is vital in MU-MIMO when the number of layers is constant and divided across the pair. Tx power gets distributed)

All the above inputs can be parsed in a near real time basis continuously and periodic real time inputs are given to the scheduler to consider creating a MU-MIMO pair transmission. The scheduler creates this pair and schedules transmission ensuring the Proportional Fair Scheduling (PFS) rules are sustained.

Effective beamforming matrices can be devised in L1 that ensure the link budget is sustained to the extent supported by a solitary layer transmission towards a UE. For example, the transmission of data in the second layer can be phase shifted by 90 degrees with respect to first layer transmission when the layers are used by UE that constitute a MIMO pair. Simulations can be done to help provide the best digital beamforming gain.

(17) DL MU-MIMO Decision Making

In a fixed antenna deployment, the beams are already formed. When MU-MIMO is invoked in a slot or multiple slots, the feedback generated for DL data will not only depend on the quality of the channel and the BLER but will also depend on quality of the digital beamforming matrix selected vis-à-vis the pair of users selected for using a set of specific physical resource block in that slot. In theory the transmission of each user in each layer in the same RB should be orthogonal to each other. For example, for first user it can be [1, j] and second user it can be [j,1]

MU-MIMO can be applied on a pair of UEs that don't exhibit significant Doppler, as there is implicit assumption that the channel won't change a great deal while using Channel Quality Indicator (CQI) for the nth frame to schedule a pair for the n+k frame. Since downlink channel quality is not wide band in nature, it is useful to understand that uplink channel quality must also be considered for pairing (reciprocity). Since there is a possibility of interference due to one user's data on the other (in case orthogonality is not maintained), it is also useful to consider DL BLER.

Also, since the pairing may not be with the same UE all the time, it is useful to consider the impact of MCS used in the UE pair at any instant (modulation order and code rate)

(18) Pairing Inputs

In some embodiments, the MAC layer can host a module that accepts the following as inputs:

a) Periodic Wideband UL pilot report per UE;

b) Sub band allocation in the DL and associated BLER per UE;

c) Statically created digital beamforming matrix code book; and d) MCS allocations to the paired UE after pairing per slot.

The wideband report keeps updating the high-level pairing of UEs based on channel feedback. The rest of the inputs (except the codebook) need to be considered for DL/UL imbalance scenarios The previous set of configurable DL allocations/BLER are checked to alter the sub-band being considered for a specific UE.

When the scheduler is fed with the final resultant pair list to be considered for a slot, additional information is provided that includes:

a) the best possible MCS combination for the pair to ensure lowest BLER. This is arrived from the previous set of configurable count of MCS allocations collected for that UE and its paired UE, and b) the code book that should be used for that pair. Code book must be arrived at based on simulations. It should consider the following inputs: 1) the channel model and delay profiles, and 2) MCS allocations in a pair.

(19) Scheduling Algorithms

Based on an appropriate, established metric, the PFS scheduler selects the best K users to be scheduled in a slot after considering the CQI and Served Rate histograms. Pairing inputs are considered to create MU-MIMO pair.

If MU-MIMO pair is not possible, a Single User MIMO (SU-MIMO) transmission is scheduled for all. In this scheduling, care must be taken to ensure that transition of a UE from SU-MIMO scheduling to MU-MIMO scheduling considers the SINR at the UE during each instant and the delta change. With 2*2, the SINR due to a MU-MIMO configuration at the UE will be lesser than in the case of a SU-MIMO configuration. So, the link adaptation in the DL should consider the same, to avoid (or reduce) BLER.

(20) Advantages of Selective MU-MIMO

Being selective in CAT A deployments is useful to utilize the Tx power of the CAT A CBSD judiciously. Also, being selective allows an additional avenue for facilitation of sustainable quality of experience, by aiding quicker transmissions and helping to reduce latency.

(21) Additional Embodiments

In some embodiments a beamforming system comprises a CBSD that supports MIMO (multiple input multiple output) antenna arrays; and selective beamforming is employed to simultaneously serve two users at the same time.

In some embodiments the two users can be served with same set of radio resources when identified to be in physical disparate locations that do not cause interference and can be served simultaneously with antenna ports based on formed-beams; and the two users are dynamically identified to be in physical locations and can be serviced simultaneously by the formed-beams.

In some embodiments the radio resources used are identified and serve in formed-beams as occupied bandwidth; and the occupied bandwidth is realized as a bandwidth part.

In some embodiments of the beamforming system, the two users that are served with different sets of radio resources, when identified to be in physical location that can cause interference with each other, can be served simultaneously with antenna ports based on formed-beams; and the resources used by the formed-beams as orthogonal radio resources can be identified by independent occupied bandwidth.

In some embodiments, each of the radio resources are used to serve in the individual formed-beams as occupied bandwidth; and the occupied bandwidth is realized as bandwidth parts.

In some embodiments, a method implemented by a CBSD comprises continuous determination of end-user device pairs. In this method, the metrics for pairing based on (QoS Flow Id) QFI/(QoS Class Identifier) QCI and (guaranteed bitrate) GBR values associated with QoS flow to which the UE is associated, can give a view of (Quality of Service) QOS.

In this method, the wide band and/or sub-band channel covariance (which can be derived from uplink pilots like SRS) can be utilized to help with channel covariance-based pairing accounting for the mobility of the end-user devices.

The last n number of power control commands, and power headroom reports generated by the end-user devices can be used to identify the potential headroom left, which helps to understand the current state of the end-user.

The static configuration—(New Radio—Absolute Radio Frequency Channel Number) ARFCN of immediate neighbors, Time Division Duplex (TDD) config of neighbors, MIMO layers in the AP and bandwidth of operation can be used to determine the impact of interference in channel covariance.

The DL block error rate (BLER), UL BLER and (Modulation and Coding Scheme) MCS allocations from last n number of allocations—used in conjunction with power control commands, (Timing Advance) TA and (Power Headroom) PHR events can be useful to understand the current state of the end-user devices.

All the above inputs can be parsed on a near real time basis continuously, and periodic real time inputs can be given to the scheduler to consider creating a MU-MIMO pair transmission; and the scheduler can create this pair and schedule transmission which can be useful to ensure that the proportional fairness rules are sustained.

Effective beamforming matrices can be devised in layer-1 (L1) that ensure the link budget is sustained to the extent supported by a solitary layer transmission towards an end-user; and the transmission of data in the second layer can be phase shifted by 90 degrees with respect to the first layer transmission, when the layers are used by UEs that constitute a MIMO pair.

The end-user device pairing may be determined in real-time, and the devices paired may be different, at different time intervals.

End-user switching between SU-MIMO scheduling and MU-MIMO scheduling can be based on the determined metrics, including 1) a determination that an effective pair of end-user devices cannot be used determine whether to service a single end-user device at a given time instant using SU-MIMO; and 2) a determination that an effective pair of end-user devices can be used to determine whether to service end-user devices at a given time instant using MU-MIMO.

Programmable Embodiments

Some or all aspects of the invention, for example aspects of the algorithmic characteristics of the invention, may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code may be applied to input data to perform the functions described in this disclosure and generate output information. The output information may be applied to one or more output devices in known fashion.

Each such computer program may be implemented in any desired computer language (including machine, assembly, or high-level procedural, logical, or object-oriented programming languages) to communicate with a computer system, and may be implemented in a distributed manner in which different parts of the computation specified by the software are performed by different computers or processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently or permanently), the storage media or device being readable by a general or special purpose programmable computer or processor for configuring and operating the computer or processor when the storage media or device is read by the computer or processor to perform the procedures described above. The inventive system may also be considered to be implemented as a non-transitory computer-readable storage medium, configured with a computer program, where the storage medium so configured causes a computer or processor to operate in a specific or predefined manner to perform the functions described in this disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" or "unit" does not imply that the components or functionality described or claimed as part of the module or unit are all configured in a common package. Indeed, any or all of the various components of a module or unit, whether control logic or other components, can be combined in a single package or separately maintained and can further be distributed in multiple groupings or packages or across multiple locations.

Additionally, the various embodiments set forth herein are described with the aid of block diagrams, flowcharts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for managing RAN resources in a wireless Enterprise Network (EN) comprises a SON (Self Organizing Network), the EN operating in a spectrum-controlled band divided into a plurality of channels, the EN including a plurality of BS/APs deployed on a campus RAN for communicating with a plurality of UEs on the campus, the BS/APs including a first BS/AP and a second BS/AP, the method comprising:

a) determining available channels in the spectrum-controlled band;

b) responsive to the available channels, determining a first instantaneous bandwidth for the first BS/AP and a second instantaneous bandwidth for the second BS/AP, the first instantaneous bandwidth overlapping the second instantaneous bandwidth;

c) activating the first BS/AP with the first instantaneous bandwidth;

d) activating the second BS/AP with the second instantaneous bandwidth; and e) operating the first BS/AP on a first occupied bandwidth smaller than the first instantaneous bandwidth, the first occupied bandwidth including a first plurality of non-contiguous bandwidth parts utilized for communication by the first BS/AP; and f) operating the second BS/AP on a second occupied bandwidth smaller than the second instantaneous bandwidth, selected to avoid interference with the first occupied bandwidth, the second occupied bandwidth includes a second plurality of non-contiguous bandwidth parts utilized for communication by the second BS/AP, the bandwidth parts of the first occupied bandwidth being orthogonal to the bandwidth parts of the second occupied bandwidth to avoid interference between the first and second BS/APs;

g) assigning, by the SON, the first and second orthogonal occupied bandwidth parts to the first and second APs, respectively; and h) monitoring CBSDs during operation to determine radio resource requirements;

i) responsive to the radio resource requirements, the EN determines whether the first BS/AP in the deployment needs additional resources;

i) if the EN determines that the first BS/AP needs additional resources, then responsive to the radio resource requirements of the other BS/APs in the RAN deployment, determining if one or more of the other BS/APs has wireless resources available; and k) if the EN determines that the first BS/AP needs additional resources, then load balancing the occupied bandwidths of the first BS/AP and said one or more of other BS/APs that have wireless resources available, responsive to the monitored radio resource requirements in the RAN deployment, the load balancing including:

(i) transferring bandwidth between one or more BS/APs in the RAN and the first BS/AP so that radio channel capacity allocations approximately balance the load for each BS/AP within RAN deployment; and (ii) changing the occupied bandwidth to be used by the first BS/AP and the transferring BS/APs, including re-assigning bandwidth parts to the first BS/AP and the transferring BS/APs responsive to the radio resource requirements; and wherein:

the load balancing determination changes at least one IBW assigned to at least one BS/AP in the RAN deployment, thereby changing the occupied bandwidth for said BS/AP; and the occupied bandwidth of each BS/AP includes a subsystem block (SSB) with an associated IBW, and the step of changing said at least one IBW further includes moving its associated SSB to its changed occupied bandwidth.

* * * * *